United States Patent
Hoyer et al.

(10) Patent No.: US 9,662,638 B2
(45) Date of Patent: May 30, 2017

(54) CATALYST FOR REDUCING NITROGEN OXIDES

(71) Applicant: UMICORE AG & CO. KG, Hanau-Wolfgang (DE)

(72) Inventors: Ruediger Hoyer, Alzenau-Hoerstein (DE); Anke Schuler, Woerth (DE); Elena Mueller, Pfungstadt (DE); Thomas Utschig, Frankfurt am Main (DE); Gerald Jeske, Neuberg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/758,913

(22) PCT Filed: Jan. 6, 2014

(86) PCT No.: PCT/EP2014/050076
§ 371 (c)(1),
(2) Date: Jul. 1, 2015

(87) PCT Pub. No.: WO2014/108362
PCT Pub. Date: Jul. 17, 2014

(65) Prior Publication Data
US 2015/0336085 A1    Nov. 26, 2015

(30) Foreign Application Priority Data
Jan. 8, 2013 (EP) ..................................... 13150457

(51) Int. Cl.
*B01D 53/94* (2006.01)
*B01D 53/56* (2006.01)
(Continued)

(52) U.S. Cl.
CPC .......... *B01J 23/63* (2013.01); *B01D 53/9422* (2013.01); *B01J 21/10* (2013.01); *B01J 35/0006* (2013.01);
(Continued)

(58) Field of Classification Search
CPC . B01J 21/04; B01J 21/10; B01J 23/005; B01J 23/02; B01J 23/10; B01J 23/42;
(Continued)

(56) References Cited

U.S. PATENT DOCUMENTS 6,245,307 B1    6/2001 Inui et al.
6,348,430 B1    2/2002 Lindner et al.
(Continued)

FOREIGN PATENT DOCUMENTS

EP    0764459 A2    3/1997
EP    0885650 A2    12/1998
(Continued)

OTHER PUBLICATIONS

International Search Report for PCT/EP2014/050076, dated Apr. 22, 2014 in English & German.
(Continued)

*Primary Examiner* — Cam N. Nguyen
(74) *Attorney, Agent, or Firm* — Smith, Gambrell & Russell, LLP

(57) ABSTRACT

The present invention relates to a nitrogen oxide storage catalyst composed of at least two catalytically active coatings on a support body, wherein a lower coating A contains cerium oxide, and platinum and/or palladium, but no alkaline earth metal compound, and an upper coating B which is disposed above coating A contains an alkaline earth metal compound, a basic mixed magnesium-aluminum oxide, and
(Continued)

Figure 1:
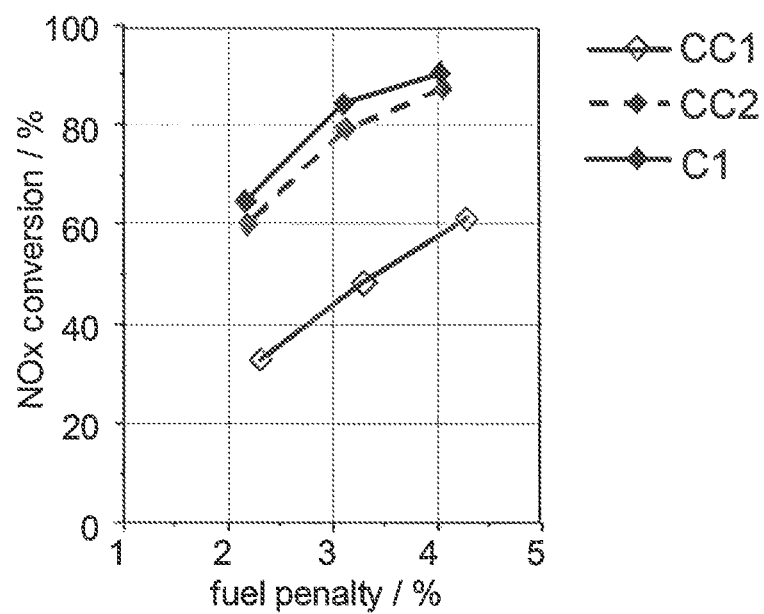

platinum and palladium, and to a method for converting $NO_x$ in exhaust gases of motor vehicles which are operated with lean-burn engines.

20 Claims, 5 Drawing Sheets

(51) Int. Cl.

| | |
|---|---|
| *B01J 8/02* | (2006.01) |
| *B01J 23/00* | (2006.01) |
| *B01J 23/02* | (2006.01) |
| *B01J 23/06* | (2006.01) |
| *B01J 23/08* | (2006.01) |
| *B01J 23/10* | (2006.01) |
| *B01J 23/14* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 21/04* | (2006.01) |
| *B01J 23/63* | (2006.01) |
| *B01J 35/00* | (2006.01) |
| *B01J 35/04* | (2006.01) |
| *B01J 37/02* | (2006.01) |
| *B01J 21/10* | (2006.01) |
| *F01N 3/08* | (2006.01) |

(52) U.S. Cl.
CPC ........... *B01J 35/04* (2013.01); *B01J 37/0244* (2013.01); *B01J 37/0248* (2013.01); *F01N 3/0814* (2013.01); *F01N 3/0842* (2013.01); B01D 2255/1021 (2013.01); B01D 2255/1023 (2013.01); B01D 2255/1025 (2013.01); B01D 2255/204 (2013.01); B01D 2255/2042 (2013.01); B01D 2255/2063 (2013.01); B01D 2255/2065 (2013.01); B01D 2255/2092 (2013.01); B01D 2255/40 (2013.01); B01D 2255/9022 (2013.01); B01D 2255/9025 (2013.01); B01D 2255/91 (2013.01); B01D 2257/404 (2013.01); B01D 2258/012 (2013.01); *B01J 35/0073* (2013.01); *F01N 2510/0684* (2013.01)

(58) Field of Classification Search
CPC ....... B01J 23/44; B01J 23/464; B01D 53/945; B01D 53/8628
USPC ....... 502/304, 327, 328, 332–334, 339, 341, 502/355, 439, 524; 423/213.2, 213.5, 423/239.1
See application file for complete search history.

(56) References Cited

U.S. PATENT DOCUMENTS

| | | | | |
|---|---|---|---|---|
| 6,350,421 | B1* | 2/2002 | Strehlau | B01D 53/9422 423/213.2 |
| 6,858,193 | B2* | 2/2005 | Ruwisch | B01D 53/9422 423/213.5 |
| 7,351,382 | B2* | 4/2008 | Pfeifer | B01D 53/944 422/177 |
| 8,454,912 | B2* | 6/2013 | Lee | B01J 20/103 210/679 |
| 8,592,337 | B2* | 11/2013 | Hilgendorff | B01D 53/9422 423/263 |
| 8,734,743 | B2* | 5/2014 | Muller-Stach | B01D 53/945 422/170 |
| 8,950,174 | B2* | 2/2015 | Hilgendorff | B01D 53/945 423/213.2 |
| 2008/0120970 | A1* | 5/2008 | Hilgendorff | B01D 53/9422 60/299 |
| 2009/0062117 | A1* | 3/2009 | Kluge | B01D 53/9422 502/304 |
| 2009/0320457 | A1 | 12/2009 | Wan | |
| 2010/0055012 | A1* | 3/2010 | Grisstede | B01D 53/9422 423/213.5 |
| 2010/0233051 | A1* | 9/2010 | Grisstede | B01D 53/9422 423/213.5 |
| 2011/0099987 | A1 | 5/2011 | Satou et al. | |
| 2011/0271658 | A1 | 11/2011 | Hoyer et al. | |
| 2012/0055141 | A1* | 3/2012 | Hilgendorff | B01J 23/58 60/301 |
| 2015/0352495 | A1 | 12/2015 | Hoyer et al. | |

FOREIGN PATENT DOCUMENTS

| | | |
|---|---|---|
| EP | 2402571 A1 | 1/2012 |
| EP | 2404669 A1 | 1/2012 |
| WO | 2010/097146 | 9/2010 |
| WO | 2012029050 A1 | 3/2012 |
| WO | 2012/085564 A1 | 6/2012 |

OTHER PUBLICATIONS

SAE Technical Paper Series 950809, dated Feb. 27-Mar. 2, 1995, Development of New Concept Three-Way Catalyst for Automotive Lean-Burn Engines, pp. 121-130/ N. Miyoshi, S. Matsumoto, K. Katoh, T. Tanaka, J. Harada, N. Takahashi, K. Yokota, M. Sugiura and K. Kasahara.
Written Opinion of the International Searching Authority for Application No. PCT/EP2014/050076 dated Jul. 8, 2015 (16 pages) (German with English Translation).

* cited by examiner

CATALYST FOR REDUCING NITROGEN OXIDES

The present invention relates to a catalyst for reducing nitrogen oxides, which is present in the exhaust gas of lean-burn internal combustion engines.

The exhaust gas of motor vehicles which are operated with lean-burn internal combustion engines, for example with diesel engines, contains not only carbon monoxide (CO) and nitrogen oxides ($NO_x$) but also constituents which originate from the incomplete combustion of the fuel in the combustion chamber of the cylinder. These include, as well as residual hydrocarbons (HCs), which are likewise predominantly in gaseous form, particulate emissions, also referred to as "diesel soot" or "soot particles". These are complex agglomerates of predominantly carbonaceous solid particles and an adhering liquid phase consisting mainly of longer-chain hydrocarbon condensates. The liquid phase adhering on the solid constituents is also referred to as soluble organic fraction (SOF) or volatile organic fraction (VOF).

To treat these exhaust gases, said constituents have to be converted very substantially to harmless compounds, which is only possible using suitable catalysts.

For removal of the nitrogen oxides, what are called nitrogen oxide storage catalysts, for which the term "lean NOx trap" or LINT is also customary, are known. The treating effect thereon is based on storage of the nitrogen oxides by the storage material of the storage catalyst predominantly in the form of nitrates in a lean operating phase of the engine, and breakdown thereof in a subsequent rich operating phase of the engine, and conversion of the nitrogen oxides thus released with the reducing exhaust gas components over the storage catalyst to give nitrogen, carbon dioxide and water. This way of working is described, for example, in the SAE document SAE 950809.

Useful storage materials especially include oxides, carbonates or hydroxides of magnesium, calcium, strontium, barium, the alkali metals, the rare earth metals or mixtures thereof. Because of their basic properties, these compounds are capable of forming nitrates with the acidic nitrogen oxides in the exhaust gas and of storing them in this way. To produce a high interaction area with the exhaust gas, they are deposited with maximum dispersion on suitable support materials. Nitrogen oxide storage catalysts additionally generally contain noble metals such as platinum, palladium and/or rhodium as catalytically active components. Their first task is to oxidize NO to $NO_2$, and CO and HC to $CO_2$, under lean conditions, and their second task is to reduce $NO_2$ released during the rich operating phases in which the nitrogen oxide storage catalyst is being regenerated to nitrogen.

With the change in the exhaust gas legislation according to Euro 6, future exhaust gas systems will have to have adequate $NO_x$ conversion both at cold temperatures in a town cycle and at high temperatures as occur at high loads. But known nitrogen oxide storage catalysts exhibit marked $NO_x$ storage either at low temperatures or at high temperatures. It has not been possible to date to achieve $NO_x$ conversion >60% at temperatures of 200 to 450° C., which is indispensable for satisfaction of future exhaust gas legislation.

EP 0 885 650 A2 describes an exhaust gas treatment catalyst for internal combustion engines having two catalytically active layers on a support body. The layer present on the support body comprises one or more finely dispersed alkaline earth metal oxides, at least one platinum group metal, and at least one finely divided oxygen-storing material. The platinum group metals here are in close contact with all the constituents of this first layer. The second layer is in direct contact with the exhaust gas and contains at least one platinum group metal, and at least one finely divided oxygen-storing material. Only a portion of the fine solids in the second layer serves as a support for the platinum group metals.

US2009/320457 discloses a nitrogen oxide storage catalyst comprising two superposed catalyst layers on a support substrate. The lower layer directly atop the support substrate comprises one or more noble metals, and one or more nitrogen oxide storage components. The upper layer comprises one or more noble metals and cerium oxide, and is free of alkali metal or alkaline earth metal components.

Catalyst substrates which contain nitrogen oxide storage materials and two or more layers are also described in WO 2012/029050. The first layer is directly atop the support substrate and comprises platinum and/or palladium, while the second layer is atop the first and comprises platinum. Both layers also contain one or more oxygen storage materials and one or more nitrogen oxide storage materials comprising one or more alkali metals and/or alkaline earth metals. The total amount of alkali metal and alkaline earth metal in the nitrogen oxide storage materials is 0.18 to 2.5 $g/in^3$, calculated as alkali metal oxide $M_2O$ and alkaline earth metal oxide MO.

The present invention relates to a nitrogen oxide storage catalyst composed of at least two catalytically active coatings on a support body, wherein
- a lower coating A contains cerium oxide, and platinum and/or palladium, but no alkaline earth metal compound and
- an upper coating B which is disposed above coating A contains an alkaline earth metal compound, a basic mixed magnesium-aluminum oxide, and platinum and palladium.

The cerium oxide used in the lower coating A may be of commercial quality, i.e. have a cerium oxide content of 90% to 100% by weight.

In one embodiment of the present invention, cerium oxide is used in an amount of 30 to 100 g/l, especially 30 to 80 g/l.

The lower coating A may contain platinum or palladium, but in preferred embodiments of the present invention it contains platinum and palladium.

In this case, the Pt:Pd ratio is in the range from 1:2 to 10:1, especially 1:1 to 4:1, for example 1:1, 2:1 and 4:1.

In further embodiments of the present invention, the lower coating A contains rhodium as a further noble metal component. The amounts of rhodium used are, for example, 1 to 10 g/cft (0.035 to 0.35 g/l).

In embodiments of the present invention, the lower coating A does not just not contain any alkaline earth metal compound, but also does not contain any nitrogen oxide storage material, especially no alkali metal compound. The expressions "no alkaline earth metal compound", "no nitrogen oxide storage material" and "no alkali metal compound", in the context of the present invention, do not mean that the lower coating A is absolutely free of these components. Instead, they may be present in small amounts as a result of the production, in the form of impurities or else through migration from the upper layer B. But these amounts do not exceed 2% by weight, based on the total weight of the coating A.

Useful alkaline earth metal compounds in the upper coating B especially include oxides, carbonates or hydroxides of strontium and barium, particularly barium oxide and strontium oxide.

In embodiments of the present invention, the alkaline earth metal compound is present in amounts of 10 to 50 g/l, particularly 15 to 20 g/l, calculated as alkaline earth metal oxide.

In the context of the present invention, the term "mixed magnesium-aluminum oxide" means that magnesium and aluminum form a mixture at the atomic level. The term includes physical mixtures of magnesium oxide and aluminum oxide. Thus, the composition of the basic mixed magnesium-aluminum oxides used in accordance with the invention, within the scope of measurement accuracy, is constant over the cross section of a powder grain, i.e. homogeneous.

In embodiments of the present invention, basic mixed magnesium-aluminum oxides in which the magnesium oxide is present in a concentration of 1% to 40% by weight, especially of 5% to 28.4% by weight, preferably 15% to 25% by weight, based on the total weight of the mixed oxide, are used.

In embodiments of the present invention, the basic mixed magnesium-aluminum oxide is present in amounts of 50 to 170 g/l, especially 100 to 150 g/l.

The upper coating B contains platinum and palladium, the Pt:Pd ratio being in the range from 1:1 to 14:1, especially 4:1 to 12:1, for example 4:1, 6:1, 8:1, 10:1 and 12:1.

Both in the lower coating A and in the upper coating B, the noble metal is typically present on suitable support materials. Support materials used are high-surface area, high-melting oxides, for example alumina, silica, titania, but also mixed oxides, for example mixed cerium-zirconium oxides.

In embodiments of the present invention, the support material used for the noble metals is alumina, especially that stabilized by 1% to 6% by weight, especially 4% by weight, of lanthanum oxide.

In addition, platinum and palladium may be present in the upper coating B wholly or partly in supported form on the basic mixed magnesium-aluminum oxide.

In a further embodiment of the present invention, the upper coating B contains cerium oxide, especially in an amount of 50 to 100 g/l.

In a preferred embodiment, the present invention relates to a nitrogen oxide storage catalyst composed of at least two catalytically active coatings on a support body, wherein
  a lower coating A contains
    cerium oxide in an amount of 30 to 80 g/l,
    platinum and palladium in a ratio of 2:1, and
    rhodium; and
  an upper coating B is disposed above the lower coating A and contains
    barium oxide in an amount of 15 to 35 g/l,
    a basic mixed magnesium-aluminum oxide having a magnesium content of 15% to 25% by weight, based on the mixed magnesium-aluminum oxide, in an amount of 50 to 150
    platinum and palladium in a ratio of 10:1, and
    cerium oxide in an amount of 50 to 100 g/l.

In a further preferred embodiment, the present invention relates to a nitrogen oxide storage catalyst composed of at least two catalytically active coatings on a support body, wherein
  a lower coating A consists of
    cerium oxide in an amount of 30 to 80 g/I,
    platinum and palladium in a ratio of 2:1, and
    rhodium; and
  an upper coating B is disposed above the lower coating A and consists of
    barium oxide in an amount of 15 to 35 g/l,
    a basic mixed magnesium-aluminum oxide having a magnesium content of 15% to 25% by weight, based on the mixed magnesium-aluminum oxide, in an amount of 50 to 150 g/l,
    platinum and palladium in a ratio of 10:1, and
    cerium oxide in an amount of 50 to 100 g/l.

The nitrogen oxide storage catalyst of the present invention comprises, in a further embodiment, a third coating C which is disposed between the support body and the lower coating A and which contains an alkaline earth metal compound, a basic mixed magnesium-aluminum oxide, and platinum and palladium. With regard to configurations of this third coating C, reference is made to the above remarks relating to the upper coating B. In fact, the third coating C may be identical to the upper coating B. According to the invention, useful support bodies especially include flow substrates made from metal and especially from ceramic materials. More particularly, they consist of cordierite, of silicon carbide, of mullite or of aluminum titanate. Numerous substrates of this kind have been described in the literature and are commercially available.

The catalytically active coatings A and B and optionally C are applied to the support bodies by the customary dip coating methods or pumping and suction coating methods with subsequent thermal aftertreatment (calcination and optionally reduction with forming gas or hydrogen). These methods are sufficiently well known from the prior art.

The nitrogen oxide storage catalysts of the invention are outstandingly suitable for conversion of $NO_x$ in exhaust gases of motor vehicles which are operated with lean-burn engines, for instance diesel engines. They attain an NOx conversion >60% at temperatures of about 200 to 500° C. and are therefore suitable for Euro 6 applications.

The present invention thus also relates to a method for converting $NO_x$ in exhaust gases of motor vehicles which are operated with lean-burn engines, for instance diesel engines, which is characterized in that the exhaust gas is passed over a nitrogen oxide storage catalyst composed of at least two catalytically active coatings on a support body, wherein
  a lower coating A contains cerium oxide, and platinum and/or palladium, and
  an upper coating B which is disposed above the coating A contains an alkaline earth metal compound, a basic mixed magnesium-aluminum oxide, and platinum and palladium.

Configurations of the method of the invention with regard to the nitrogen oxide storage catalyst correspond to the descriptions above.

The invention is elucidated in detail in the examples and figures which follow.

FIG. 1: NOx conversion of catalysts C1, CC1 and CC2 at 420° C. as a function of the "fuel penalty".

Figure 2:
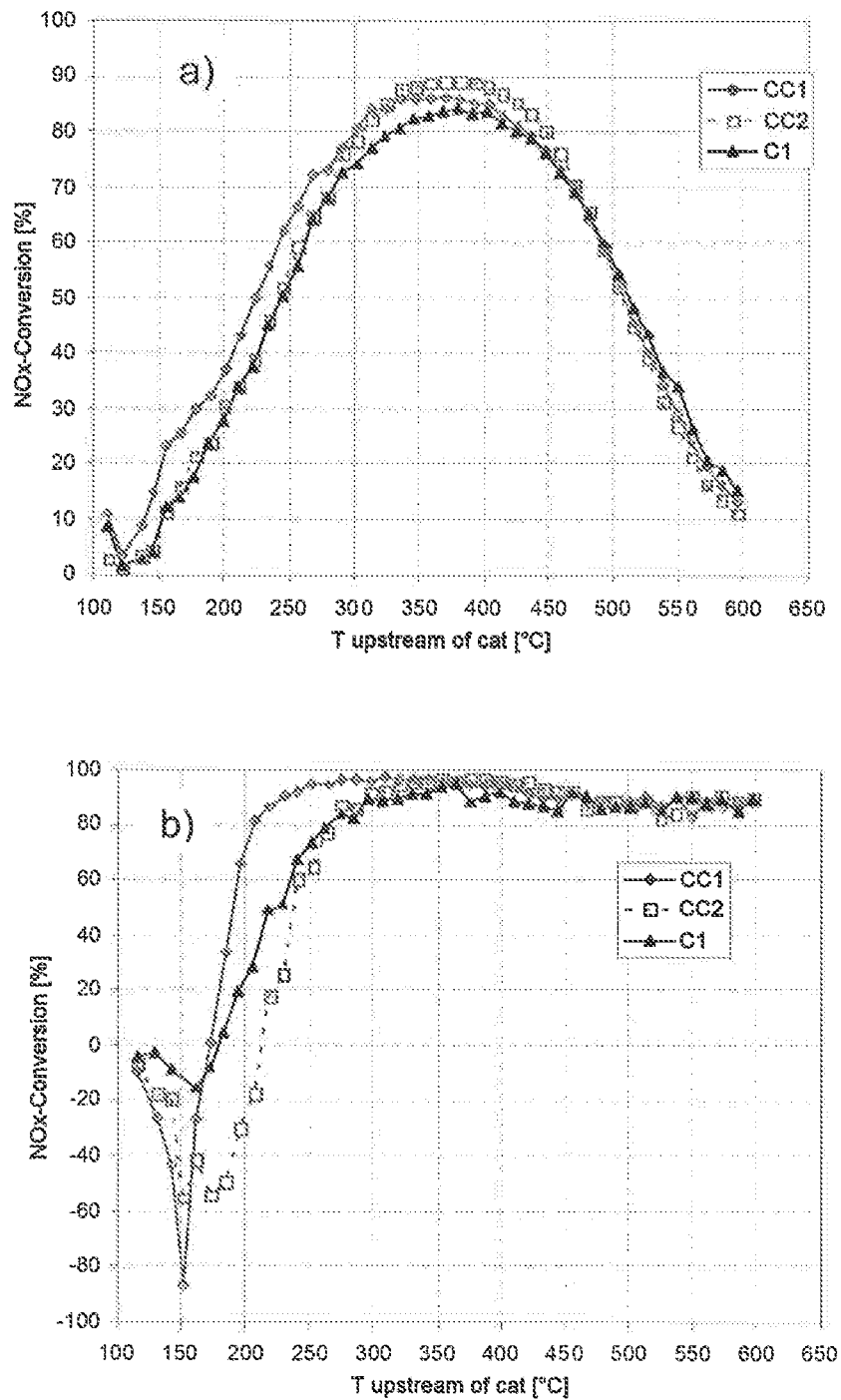

FIG. 2: NOx conversion of catalysts C1, CC1 and CC2 as a function of temperature in a lean (a) and rich (b) operating phase.

Figure 3:
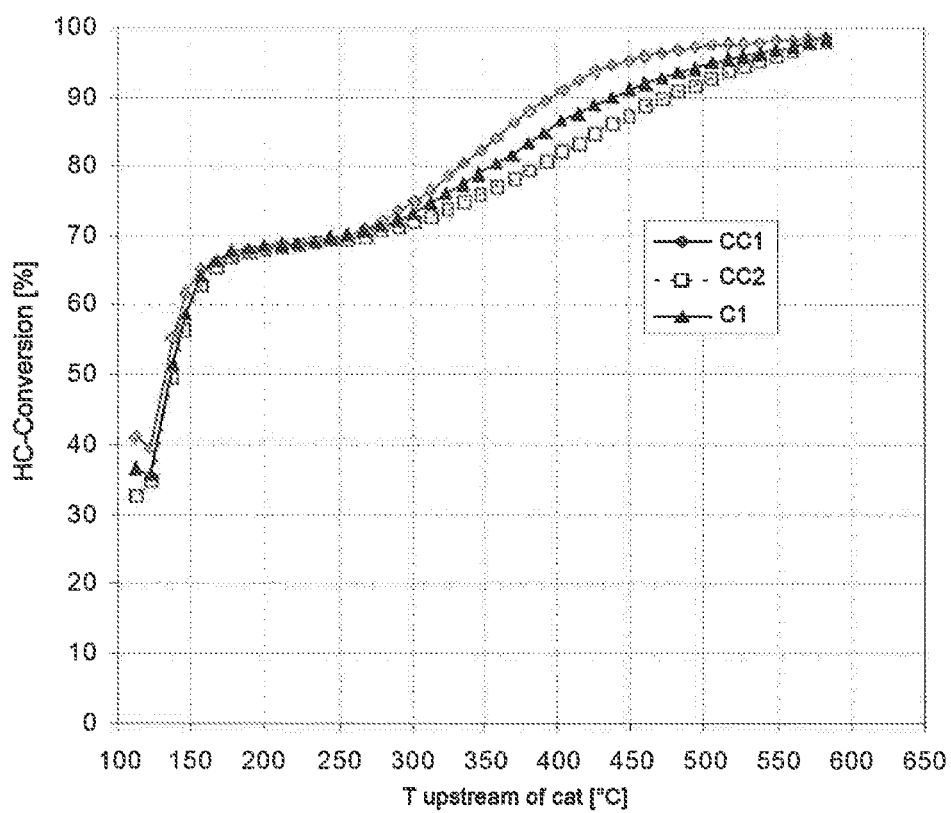

FIG. 3: HC conversion of catalysts C1, CC1 and CC2 as a function of temperature in a lean operating phase.

Figure 4:
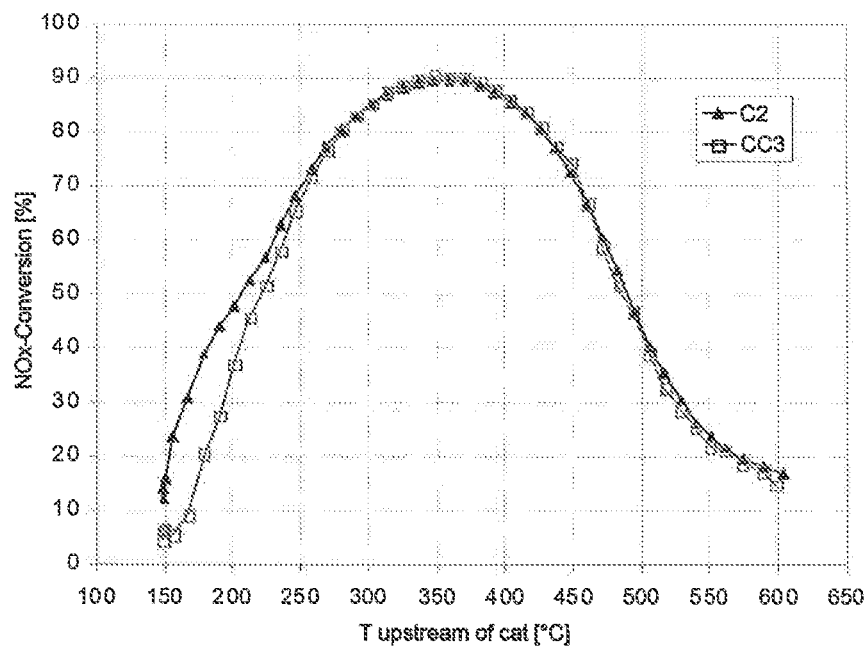

FIG. 4: NOx conversion of catalysts C2 and CC3 as a function of temperature in a rich/lean operating phase.

Figure 5:
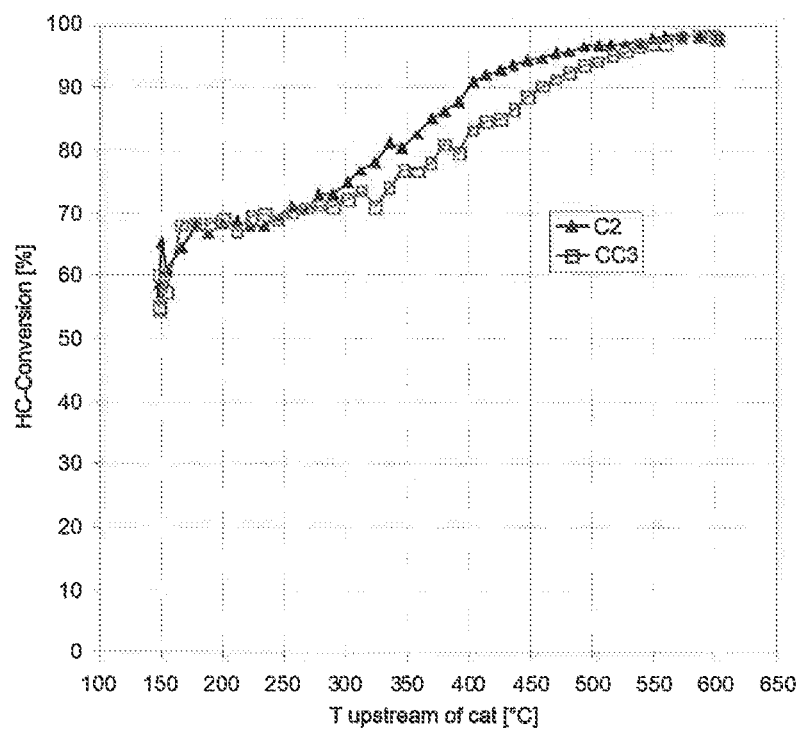

FIG. 5: HC conversion of catalysts C2 and CC3 as a function of temperature in a lean operating phase.

Figure 6:
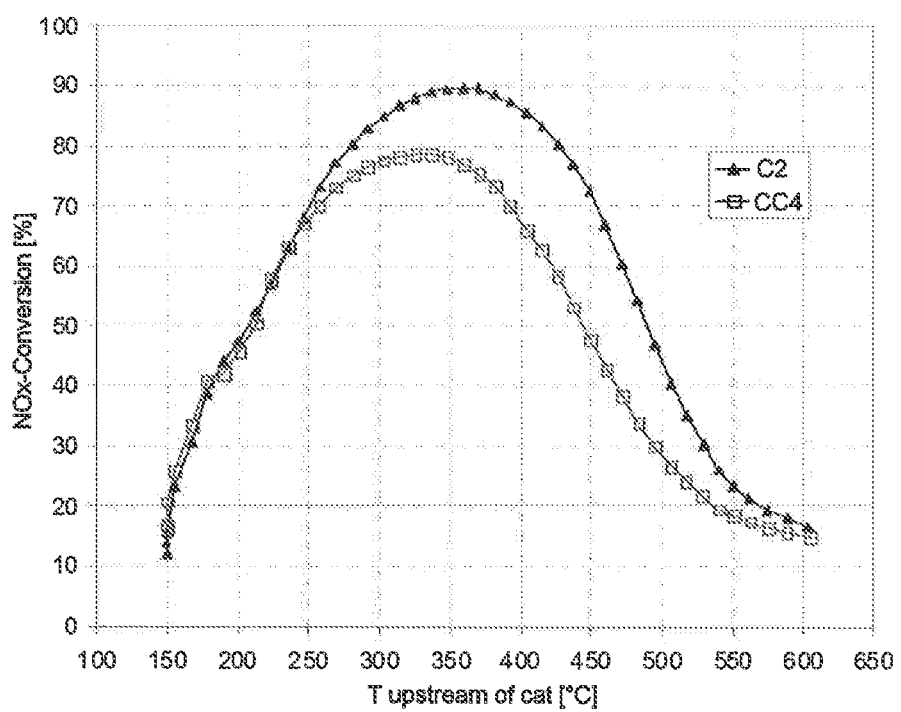

FIG. 6: NOx conversion of catalysts C2 and CC4 as a function of temperature in a rich/lean operating phase.

EXAMPLE 1

To prepare a catalyst of the invention, a ceramic support in honeycomb form is coated with a first washcoat layer A containing Pt, Pd and Rh supported on a lanthanum-stabilized alumina, and ceria in an amount of 55 g/l. The loading of Pt, Pd and Rh is 20 g/cft (0.70 g/l), 10 g/cft (0.35 g/l) and 5 g/cft (0.175 g/l) and the total loading of the washcoat layer is 98 g/l based on the volume of the ceramic support. Applied to the first washcoat layer is a further washcoat layer B likewise containing Pt and Pd supported on a lanthanum-stabilized alumina. In addition, the washcoat layer contains 31 g/l of BaO supported on a mixed magnesium-aluminum oxide and a further cerium oxide component. The respective loadings of Pt and Pd in this washcoat layer are 60 g/cft (2.1 g/l) and 6 g/cft (0.21 g/l), while the total washcoat loading is 258 g/l.

The catalyst thus obtained is called C1 hereinafter.

COMPARATIVE EXAMPLE 1

Comparative example 1 differs from example 1 in that the washcoat layers A and B have been exchanged in respect of their sequence on the ceramic support in honeycomb form. Washcoat layer B from example 1 has thus been applied directly to the ceramic support and bears washcoat layer A from example 1. The catalyst thus obtained is called CC1 hereinafter.

COMPARATIVE EXAMPLE 2

Comparative example 2 differs from example 1 in that the first and second washcoat from example 1 have been mixed prior to coating to give one washcoat and hence a homogeneous coating was applied to a ceramic support in honeycomb form. The catalyst thus obtained is called CC2 hereinafter.

Comparison of Example 1 with Comparative Examples 1 and 2 a) Before the comparison, catalysts C1, CC1 and CC2 were aged at 800° C. in a hydrothermal atmosphere for 16 hours.
b) EP 2 402 571 A1 shows that, in the case of high-frequency HC dosage by means of an injector upstream of the catalyst, it is possible to achieve high NOx conversions which cannot be achieved in this way under standard NOx storage conditions. Thus, it is still possible to viably operate an NOx storage catalyst even under high loads. For comparison of catalysts C1, CC1 and CC2, this method was employed, using an engine testbed having a 2.0 L TDI diesel engine.

The engine was operated here at a constant operating point with 2000 1/min revolutions and a torque of 250 nm. The exhaust gas temperature which was passed over the catalysts was 420° C. To reduce the nitrogen oxides, an injector was used to inject diesel fuel directly upstream of the catalyst every 3 seconds. The injection time in operation was 10-20 ms.

In FIG. 1, the NOx conversion is plotted as a function of the amount of diesel fuel metered in addition to the fuel consumption of the engine (fuel penalty). It is noticeable here that the inventive catalyst C1 having a Ba-containing upper washcoat layer shows the highest conversion, while comparative catalyst CC1 having the reverse layer structure has a much lower conversion. The homogeneous catalyst CC2 shows a conversion which is much better than that of CC1, but poorer than that of the inventive catalyst C1.

c) FIGS. 2 and 3 show the NOx conversion and HC conversion of the inventive catalyst C1 and the comparative catalysts CC1 and CC2 as a function of temperature upstream of the catalyst in a model gas reactor. While the temperature is being lowered from 600° C. to 150° C. at 7.5° C. per minute, the catalyst is contacted alternately with "lean" exhaust gas for 80 s and with "rich" exhaust gas for 10 s. During the test, a constant 500 ppm of NO and 33 ppm of propene and 17 ppm of propane are metered in.

FIG. 2 shows the NOx conversion separately for lean phase and rich phase. While all the catalysts under these conditions show comparable NOx conversions at temperatures above 400° C., the catalyst CC1 at temperatures <300° C. shows the highest NOx conversion. But what is noticeable particularly under "rich" exhaust gas conditions is that the inventive catalyst C1 has a higher NOx conversion than the homogeneously coated catalyst CC2.

FIG. 3 likewise shows that the HC conversion is at its greatest when, as in comparative example 1, the Ba-free washcoat layer has been applied to the Ba-containing lower washcoat layer. However, advantages are found here too for the reverse layer structure from example 1 over the homogeneous catalyst structure from comparative example 2.

From the point of view that a catalyst should convert NOx very efficiently both at cold exhaust gas temperatures and at temperatures above 400° C. with HC dosage, the overall result of the experiments described is that the inventive catalyst C1 has distinct advantages compared to the comparative catalysts CC1 and CC2.

EXAMPLE 2

For production of an inventive catalyst, a ceramic support in honeycomb form is coated with a first washcoat layer A containing Pt, Pd and Rh supported on a lanthanum-stabilized alumina, and ceria in an amount of 55 g/l. The loading of Pt, Pd and Rh is 20 g/cft (0.70 g/l), 10 g/cft (0.35 g/l) and 5 g/cft (0.175 g/l), and the total loading of the washcoat layer is 98 g/l, based on the volume of the ceramic support. Applied to the first washcoat layer is a further washcoat layer B which likewise contains Pt and Pd supported on a lanthanum-stabilized alumina. In addition, the washcoat layer contains a cerium oxide component and 21 g/l of BaO supported on a mixed magnesium-aluminum oxide additionally doped with ceria. The respective loadings of Pt and Pd in this washcoat layer are 60 g/cft (2.1 g/l) and 6 g/cft (0.21 g/l), while the total washcoat loading is 258 g/l. The catalyst thus obtained is called C2 hereinafter.

COMPARATIVE EXAMPLE 3

Comparative example 3 differs from example 2 in that the lower washcoat layer A additionally contains 11 g/l BaO supported on the ceria. The catalyst thus obtained is called CC3 hereinafter.

COMPARATIVE EXAMPLE 4

Comparative example 4 differs from example 2 in that BaO is supported on a ceria-doped alumina, while the equivalent amount of MgO is added in the form of acetate to the washcoat suspension.

The catalyst thus obtained is called CC4 hereinafter.

Comparison of Example 2 with Comparative Example 3

FIGS. 4 and 5 how the NOx conversion and HC conversion of the inventive catalyst C2 and of the comparative catalyst CC3 as a function of temperature upstream of the catalyst under the same test conditions as in FIGS. 2 and 3, with the difference that, in FIG. 4, the NOx conversion is plotted in a "lean/rich" cycle, i.e. 80 s of "lean" exhaust gas+10 s of "rich" exhaust gas.

It is apparent in FIG. 4 that the comparative catalyst CC3 has a much lower NOx conversion at temperatures of <250° C. compared to the inventive catalyst C2. FIG. 5 shows that the inventive catalyst C2 has a higher HC conversion compared to comparative catalyst CC3.

Comparison of Example 2 with Comparative Example 4

Analogously to FIG. 4, FIG. 6 shows the NOx conversion of the inventive catalyst C2 and of the comparative catalyst CC4 as a function of temperature upstream of the catalyst. It is clearly apparent that the inventive catalyst C2 has a much better NOx conversion compared to comparative catalyst CC4.

The invention claimed is:

1. A nitrogen oxide storage catalyst composed of at least two catalytically active coatings on a support body, wherein a lower coating A contains cerium oxide, and platinum and/or palladium, but no alkaline earth metal compound and an upper coating B which is disposed above coating A contains an alkaline earth metal compound, a basic mixed magnesium-aluminum oxide, and platinum and palladium, and wherein the lower coating A contains cerium oxide in an amount of 30 to 100 g/l.

2. The nitrogen oxide storage catalyst as claimed in claim 1 wherein the lower coating A contains platinum and palladium.

3. The nitrogen oxide storage catalyst as claimed in claim 2, wherein the Pt:Pd ratio in the lower coating A is in the range from 1:2 to 10:1.

4. The nitrogen oxide storage catalyst as claimed in claim 1, wherein the lower coating A contains rhodium.

5. The nitrogen oxide storage catalyst as claimed in claim 1, wherein the upper coating B contains alkaline earth metal compound in amounts of 10 to 50 g/l.

6. The nitrogen oxide storage catalyst as claimed in claim 1, wherein the upper coating B contains barium oxide or strontium oxide.

7. The nitrogen oxide storage catalyst as claimed in claim 1, wherein the upper coating B contains basic mixed magnesium-aluminum oxide, wherein magnesium oxide is present in a concentration of 1% to 40% by weight, based on the total weight of the mixed oxide.

8. The nitrogen oxide storage catalyst as claimed claim 1, wherein the upper coating B contains platinum and palladium with a Pt:Pd ratio of 1:1 to 14:1.

9. The nitrogen oxide storage catalyst as claimed in claim 1, wherein, in the upper coating B, platinum and palladium are present wholly or partly in supported form on the basic mixed magnesium-aluminum oxide.

10. The nitrogen oxide storage catalyst as claimed in claim 1, wherein the upper coating B contains cerium oxide.

11. The nitrogen oxide storage catalyst as claimed in claim 1, wherein the lower coating A contains cerium oxide in an amount of 30 to 80 g/l, platinum and palladium in a ratio of 2:1, and rhodium; and the upper coating B is disposed above the lower coating A and contains barium oxide in an amount of 15 to 35 g/l, a basic mixed magnesium-aluminum oxide having a magnesium content of 15% to 25% by weight, based on the mixed magnesium-aluminum oxide, in an amount of 50 to 150 g/l, platinum and palladium in a ratio of 10:1, and cerium oxide in an amount of 50 to 100 g/l.

12. The nitrogen oxide storage catalyst as claimed in claim 1, wherein the lower coating A consists of cerium oxide in an amount of 30 to 80 g/l, platinum and palladium in a ratio of 2:1, and rhodium; and the upper coating B is disposed above the lower coating A and consists of barium oxide in an amount of 15 to 35 g/l, a basic mixed magnesium-aluminum oxide having a magnesium content of 15% to 25% by weight, based on the mixed magnesium-aluminum oxide, in an amount of 50 to 150 g/l, platinum and palladium in a ratio of 10:1, and cerium oxide in an amount of 50 to 100 g/l.

13. The nitrogen oxide storage catalyst as claimed in claim 1, further comprising a third coating C which is disposed between the support body and the lower coating A and contains an alkaline earth metal compound, a basic mixed magnesium-aluminum oxide, and platinum and palladium.

14. The nitrogen oxide storage catalyst as claimed in claim 1, wherein the lower coating A contains cerium oxide in an amount of 30 to 80 g/l.

15. The nitrogen oxide storage catalyst as claimed in claim 1, wherein upper coating B is disposed above the lower coating A and contains barium oxide in an amount of 15 to 35 g/l, a basic mixed magnesium-aluminum oxide having a magnesium content of 15% to 25% by weight, based on the mixed magnesium-aluminum oxide, in an amount of 50 to 150 g/l, and cerium oxide in an amount of 50 to 100 g/l.

16. A nitrogen oxide storage catalyst composed of at least two catalytically active coatings on a support body, wherein a lower coating A contains cerium oxide, and platinum and/or palladium, but no alkaline earth metal compound and an upper coating B which is disposed above coating A contains an alkaline earth metal compound, a basic mixed magnesium-aluminum oxide, and platinum and palladium, and wherein the nitrogen oxide storage catalyst further comprises a third coating C which is disposed between the support body and the lower coating A and contains an alkaline earth metal compound, a basic mixed magnesium-aluminum oxide, and platinum and palladium.

17. A method for converting $NO_x$ in exhaust gases of motor vehicles which are operated with lean-burn engines, wherein the exhaust gas is passed over a nitrogen oxide storage catalyst composed of at least two catalytically active coatings on a support body, wherein a lower coating A contains cerium oxide in an amount of 30 to 100 g/l, and platinum and/or palladium, and an upper coating B which is disposed above the coating A contains an alkaline earth metal compound, a basic mixed magnesium-aluminum oxide, and platinum and palladium.

18. The method of claim 17 is wherein the lean-burn engine is a diesel engine.

19. The method of claim 17 wherein the nitrogen oxide storage catalyst over which the exhaust gas is passed further comprises a third coating C disposed between the support body and the lower coating A and which contains an alkaline earth metal compound, a basic mixed magnesium-aluminum oxide, and platinum and palladium.

20. The method of claim 17 wherein the upper coating B contains at least one of barium oxide and strontium oxide.

* * * * *